No. 728,499. PATENTED MAY 19, 1903.
J. C. REUTER.
MOTOR VEHICLE.
APPLICATION FILED JULY 3, 1902.
NO MODEL. 2 SHEETS—SHEET 2.
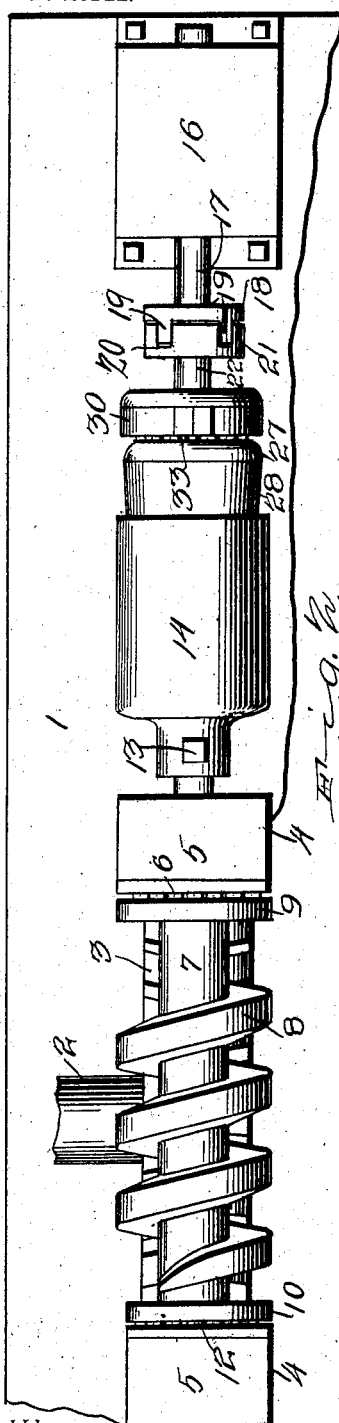
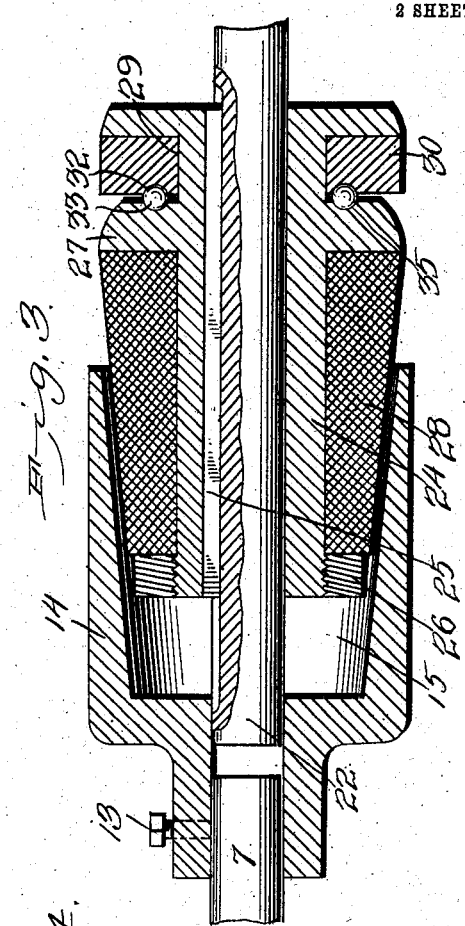
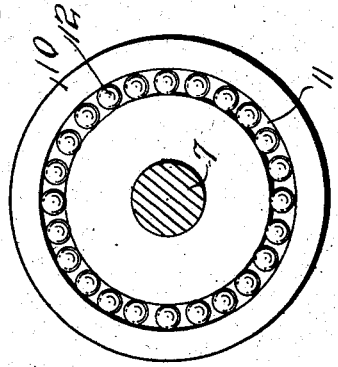
John C. Reuter, Inventor.

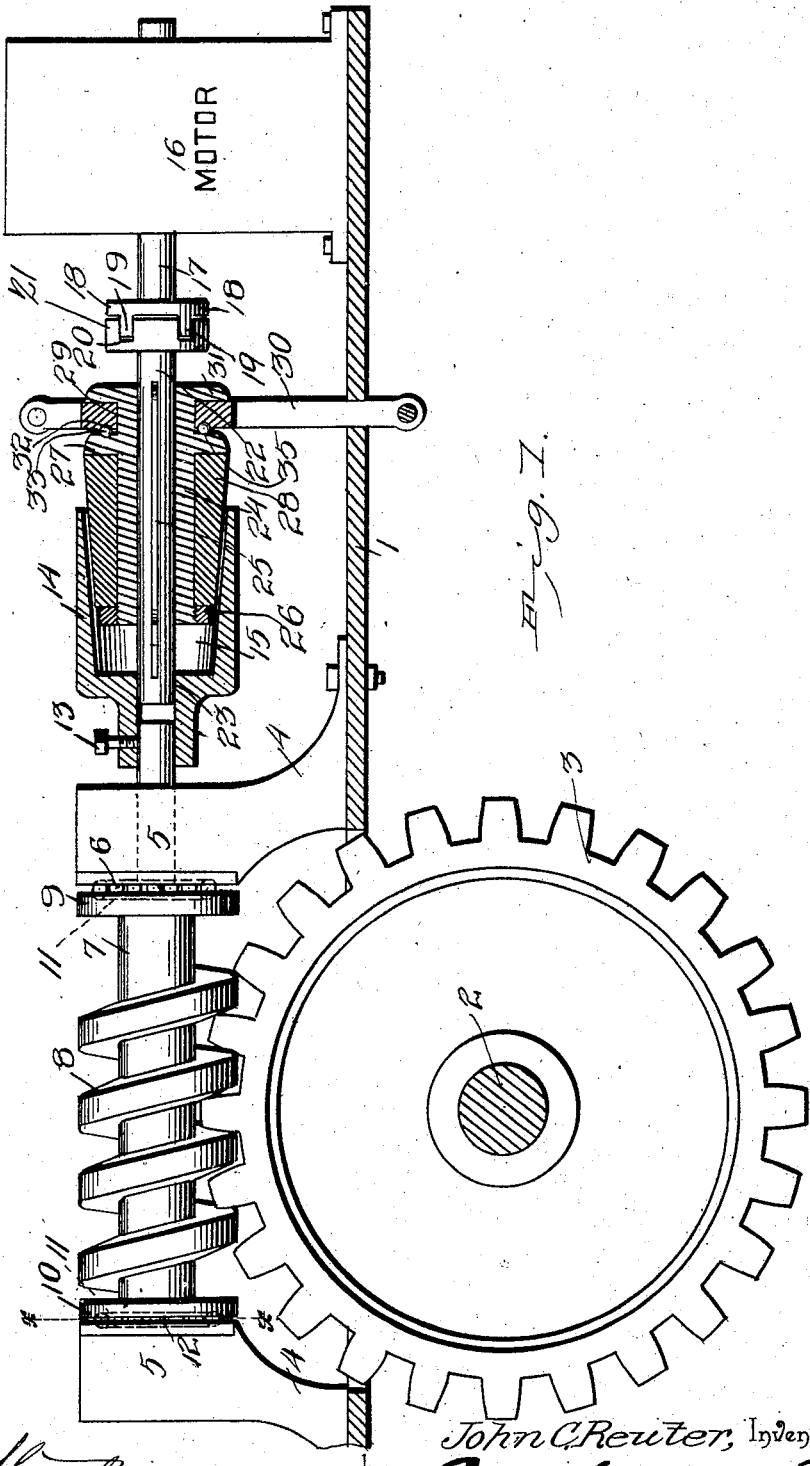

No. 728,499. Patented May 19, 1903.

UNITED STATES PATENT OFFICE.

JOHN C. REUTER, OF ST. LOUIS, MISSOURI.

MOTOR-VEHICLE.

SPECIFICATION forming part of Letters Patent No. 728,499, dated May 19, 1903.

Application filed July 3, 1902. Serial No. 114,286. (No model.)

*To all whom it may concern:*

Be it known that I, JOHN C. REUTER, a citizen of the United States, residing at St. Louis, in the State of Missouri, have invented a new and useful Motor-Vehicle, of which the following is a specification.

This invention relates to gearing for motor-vehicles; and it has for its object to provide for the transmission of power from the source of power to the driving shaft or axle of the machine.

In carrying out my invention I avail myself of a worm-gear mounted directly upon the axle or drive-shaft and meshing with a worm upon a shaft which is located in alinement with and driven directly from the main power-shaft, thus attaining a great simplicity in the construction and arrangement of the operating parts of the invention.

The detailed construction and arrangement of the parts comprising my invention will be hereinafter more fully described, and particularly pointed out in the claims.

In the accompanying drawings, Figure 1 is a sectional elevation of as much of a motor-vehicle as is necessary to illustrate my invention. Fig. 2 is a plan view of the same. Fig. 3 is an enlarged sectional detail view of the friction means for transmitting motion. Fig. 4 is an enlarged sectional detail view taken on the line $x\ x$ in Fig. 1.

Corresponding parts in the several figures are indicated by like characters of reference.

1 designates the vehicle-frame, and 2 the main drive-shaft or axle, upon which is mounted the worm-gear 3. Brackets 4 4, suitably mounted and supported upon the frame, carry the boxes 5 5, containing antifriction-bearings 6 for the ends of a shaft 7, having the spiral coil or worm 8, meshing with the worm-gear 3. These antifriction-bearings supporting the worm-shaft 7 are made the subject of another application for Letters Patent of even date with this present application and need not be described in detail herein. The ends of the shaft 7, engaging the antifriction-bearings, have been shown as being reduced in diameter. This is a nonessential and incidental feature of construction. The portion of the shaft 7 which carries the worm 8 is provided with flanges or collars 9, and similar flanges or collars 10 may be arranged in contact with the boxes 5. The flanges 9 and 10 are provided with annular grooves 11, forming ball-races in which antifriction-balls 12 are placed. These antifriction devices are designed to avoid friction caused by end thrust in either direction.

Suitably secured upon the rear end of the shaft 7 by means of a set-screw 13 or some other suitable fastening device is a steel cup 14, having a tapering recess 15. This cup-shaped device constitutes one member of a friction device which is employed for transmitting motion from the source of power to the worm-shaft, as will be hereinafter more fully described. 16 designates conventionally a motor which is supported upon the frame 1 in such a position that its main shaft 17 shall be in longitudinal axial alinement with the worm-shaft 7. The front end of the shaft 17 carries a clutch member 18, consisting of a collar having a series of pins or fingers 19, projecting from the face thereof and engaging corresponding recesses 20 in a clutch member 21, consisting of a collar suitably secured upon a shaft-section 22, which extends loosely through the cup-shaped clutch member 14 and into the bore 23 of the latter, which receives the rear end of the worm-shaft 7. It will thus be seen that the loose shaft-section 22 is supported at its ends in the bore of the friction member 14 and by the fingers 19 of the clutch member 18 and in such a manner as to be capable of a limited play or longitudinal movement.

The shaft-section 22 carries a sleeve 24, which is slidable upon the said shaft-section and also connected so as to revolve therewith by means of a key or feather 25 or any other suitable means. Thus, for instance, the shaft-section 22 may be made angular for a portion of its length to fit a correspondingly-shaped bore extending through the sleeve. The latter is provided at its ends with flanges 26 and 27, between which is mounted a tapering or frustum-shaped friction-disk 28, adapted to engage the interior tapering recess 15 of the cup or friction member 14. The sleeve 24 is extended at its rear end to engage an opening 29 in a lever 30, which is suitably fulcrumed to the frame of the vehicle. The sleeve 24 is provided near its rear end with a collar 31, engaging against the rear side of the lever 30. The front side of the latter is provided with an annular groove 32, surrounding the sleeve and forming a ball-race, in which friction-balls 33 are placed in such a manner as to engage a corresponding groove 35 in the rear side of the collar 27 upon the sleeve.

The operation of my invention, broadly considered, is as follows: Motion is transmitted from the motor-shaft 17 by the clutch 18 to 20 to the loose shaft-section 22. By operating the lever 30, which may be connected, by means of rods or flexible connections, (not shown in the drawings,) with a suitably-disposed operating-lever adapted to be operated either by hand or foot pressure, the sleeve carrying the friction-surface 28 may be forced into the cup-shaped friction member 14, thus transmitting motion from the loose shaft-section 22 to the worm-shaft 7, from which motion is in turn transmitted to the axle or main drive-shaft of the vehicle. It will thus be seen that the transmission of motion is absolutely direct and that there is practically no opportunity for loss of power.

As regards the details of the device the following points are considered worthy of note:

The worm-shaft being mounted at its ends in antifriction-bearings the friction between said worm-shaft and its related parts will be so reduced that motion will be transmitted not only from the worm 8 to the worm-gear 3, but also reversely from the worm-gear to the worm—as, for instance, when the vehicle is coasting. This result may be aided by properly determining the respective pitch of the teeth of the worm-gear and the spiral of the worm, and it is largely assisted by the reduction in friction which is due to the antifriction-bearings between the ends of the worm-shaft and the sides of the boxes, whereby friction due to end thrust in either direction is entirely avoided. It is obvious that these end bearings may be arranged to engage the outer as well as the inner sides of the boxes 5 and that numerous modifications in the construction and arrangement of these parts of the device might be made without detracting from the utility of my invention or departing from the spirit thereof, and I reserve the right for such modifications.

By the friction device herein described it will be noted that communication may be instantaneously established or cut off between the drive-shaft of the motor and the worm-shaft by simply operating the lever 30. The means herein described for providing an antifriction bearing-surface between the said lever 30 and the collar 27 of the friction member composed of the sleeve 24 and its related parts will obviously provide for the transmission of power at this point with little or no friction. This is partly due to the fact that as soon as the friction-disk 28 has become wedged in the recess 15 of the cup 14 it is by no means necessary to exert a continued heavy pressure upon the lever.

By the herein-described arrangement of the loose shaft-section 22 between the worm-shaft and the motor-shaft 17 I attain the very important object of preventing the racking and straining which otherwise would or might result. I reserve the right, however, to omit the coupling composed of the members 18 and 20 and to arrange the friction member consisting of the sleeve 24 and its related parts directly upon the motor-shaft in case I shall deem it desirable for any reason to do so.

The general construction and arrangement of the parts comprising my invention, as will be seen from the foregoing description, are extremely simple, and I am enabled by the employment of this device to produce a motor-vehicle possessing superior advantages in point of simplicity, durability, and general efficiency.

I desire it to be distinctly understood that I do not limit myself as regards the exact and specific construction of any of the parts of the device, but reserve the right to all modifications which may be resorted to without departing from the spirit and scope of the invention and without detracting from the utility thereof.

Having thus described my invention, I claim and desire to secure by Letters Patent of the United States—

1. In a device of the class described, the combination of a worm-shaft, a friction member having a tapering recess mounted upon said shaft, a shaft connected loosely with the source of power and capable of limited play, a friction member having a tapering surface mounted slidingly upon said shaft, within said tapering recess, and means for moving the slidable friction member into or out of contact with the friction member mounted upon the worm-shaft, substantially as set forth.

2. In a device of the class described, the combination of a worm-shaft, a friction member having a tapering recess mounted upon said shaft, a shaft connected loosely with the source of power and capable of limited play, a friction member having a tapering surface mounted slidingly upon said shaft, within said tapering recess, a lever engaging said slidable friction member and antifriction-balls mounted between the contacting surfaces of said lever and friction member, substantially as set forth.

3. In a device of the class described, the combination of a worm-shaft, a cup-shaped friction member having a longitudinal bore receiving and secured upon said shaft, a shaft loosely connected with the source of power, a friction member mounted slidingly within said cup-shaped friction member upon said shaft, said slidable friction member comprising a sleeve, collars upon said sleeve, and a friction-disk clamped between two of said collars, a lever engaging said sleeve, and antifriction-balls interposed between said lever and the contacting surface of the adjacent collar upon said sleeve, substantially as set forth.

4. In a device of the class described, the means for transmitting motion between the worm-shaft and the source of power, the same comprising a friction member upon the worm-shaft, a clutch member upon the power-shaft, a suitably-supported loose shaft-section between the worm-shaft and the power-shaft and having engagement with the clutch member upon the latter, and a friction member mounted slidably upon said loose shaft-section, substantially as set forth.

5. In a device of the class described, the worm-shaft and the power-shaft located in longitudinal axial alinement in combination with a suitably-supported intermediate loose shaft-section, means for connecting the latter with the power-shaft and suitably-operated friction means for transmitting motion from said loose shaft-section to the worm-shaft, substantially as set forth.

6. In a device of the class described, the combination of the worm-shaft and the power-shaft located in longitudinal axial alinement, an intermediate suitably-supported loose shaft-section, means for connecting the latter with the power-shaft in such a manner as to provide for a limited longitudinal movement of said loose shaft-section, a friction member mounted slidably upon the latter, and a friction member mounted securely upon the worm-shaft and adapted to be engaged by the said slidable friction member, substantially as set forth.

7. In a device of the class described, the combination of the worm-shaft, a friction member mounted upon said worm-shaft and having a longitudinal bore extending beyond the latter, the power-shaft located in longitudinal alinement with the worm-shaft and having a clutch member, an intermediate loose shaft-section having a clutch member slidably engaging the clutch member of the power-shaft and having its opposite end slidably supported in the bore of the friction member upon the worm-shaft, a friction member mounted slidably upon the said loose shaft-section, and means for carrying the said slidable friction member into or out of engagement with the fixed friction member upon the worm-shaft, substantially as set forth.

In testimony that I claim the foregoing as my own I have hereto affixed my signature in the presence of two witnesses.

JOHN C. REUTER.

Witnesses:
 J. H. JOCHUM, Jr.,
 FRANK S. APPLEMAN.